United States Patent
Zizka et al.

(10) Patent No.: US 10,437,885 B2
(45) Date of Patent: Oct. 8, 2019

(54) GRAPH MODELING OF APPLICATIONS FOR DETECTION OF DUPLICATE MODULES

(71) Applicant: Red Hat, Inc., Raleigh, NC (US)

(72) Inventors: Ondrej Zizka, Ceske Budejovice (CZ); Jesse Daniel Sightler, Moncks Corner, SC (US)

(73) Assignee: Red Hat, Inc., Raleigh, NC (US)

( * ) Notice: Subject to any disclaimer, the term of this patent is extended or adjusted under 35 U.S.C. 154(b) by 89 days.

(21) Appl. No.: 15/861,537

(22) Filed: Jan. 3, 2018

(65) Prior Publication Data

US 2019/0205479 A1 Jul. 4, 2019

(51) Int. Cl.
 G06F 15/173 (2006.01)
 G06F 16/901 (2019.01)
 G06F 9/50 (2006.01)
 G06F 9/48 (2006.01)
 G06F 8/70 (2018.01)

(52) U.S. Cl.
 CPC ............ *G06F 16/9024* (2019.01); *G06F 8/70* (2013.01); *G06F 9/4856* (2013.01); *G06F 9/5077* (2013.01)

(58) Field of Classification Search
 USPC ....................................................... 709/226
 See application file for complete search history.

(56) References Cited

U.S. PATENT DOCUMENTS

| | | | |
|---|---|---|---|
| 8,719,779 B2 | 5/2014 | Kalthoff et al. | |
| 8,914,784 B2 | 12/2014 | Krcese et al. | |
| 9,146,847 B2 | 9/2015 | Corrie | |
| 9,195,503 B2 | 11/2015 | Chung et al. | |
| 9,330,411 B2 | 5/2016 | Zhou et al. | |
| 9,715,376 B2 | 7/2017 | Wang et al. | |
| 2007/0162903 A1* | 7/2007 | Babb, II | G06F 8/75 717/154 |
| 2016/0012152 A1* | 1/2016 | Johnson | G06F 16/9024 707/798 |

(Continued)

OTHER PUBLICATIONS

Tetsuya Kanda et al., "Measuring Copying of Java Archives", Position Paper, Electronic Communications of the EASST, vol. 63 (2014), 7 pages.

(Continued)

*Primary Examiner* — Hee Soo Kim
(74) *Attorney, Agent, or Firm* — Lowenstein Sandler LLP

(57) ABSTRACT

Implementations of the disclosure provide for graph modeling of applications for detection of duplicate modules. In one embodiment, an apparatus comprising: a memory to store graphs; and a processing device, operatively coupled to the memory is provided. The processing device identify a first executable code module of a plurality of executable code modules associated with an application represented by a graph data structure. The graph data structure is updated with an indicator for each of the executable code modules matching the first module. The indicator references the first executable code module. One or more corresponding modules associated with the graph data structure are selected in view of the indicator. Using the graph data structure, an amount of a computing resource to allocate for a migration of the corresponding modules of the application is determined in view of a selection criterion.

20 Claims, 5 Drawing Sheets

(56) References Cited

U.S. PATENT DOCUMENTS

| | | | |
|---|---|---|---|
| 2016/0026677 A1* | 1/2016 | Feo | G06F 16/242 |
| | | | 707/718 |
| 2016/0062747 A1* | 3/2016 | Stanfill | G06F 16/22 |
| | | | 717/144 |
| 2016/0117358 A1* | 4/2016 | Schmid | G06F 16/24 |
| | | | 707/736 |
| 2016/0179887 A1* | 6/2016 | Lisonbee | G06F 16/9024 |
| | | | 707/718 |
| 2018/0246988 A1* | 8/2018 | Johnson | G06F 16/9038 |

OTHER PUBLICATIONS

Javin Paul, "3 Ways to Find Duplicate Elements in an Array—Java", Javarevisited.blogspot, Jun. 2015, 7 pages.

* cited by examiner

GRAPH MODELING OF APPLICATIONS FOR DETECTION OF DUPLICATE MODULES

TECHNICAL FIELD

The implementations of the disclosure relate generally to software development and, more specifically, relate to graph modeling of applications for detection of duplicate modules.

BACKGROUND

An application is a computer program designed to perform a group of coordinated functions, tasks, or activities for the benefit of users of a system. Some larger systems may consist of many applications, modules and submodules. Each of the modules and submodules are capable of producing and/or consuming data that can, in turn, be consumed and/or produced, by one or more other modules and submodules of the applications.

BRIEF DESCRIPTION OF THE DRAWINGS

The disclosure can be understood more fully from the detailed description given below and from the accompanying drawings of various implementations of the disclosure. The drawings, however, should not be taken to limit the disclosure to the specific implementations, but are for explanation and understanding only.

The disclosure is illustrated by way of examples, and not by way of limitation, and may be more fully understood with references to the following detailed description when considered in connection with the figures, in which.

DETAILED DESCRIPTION

Figure 1:
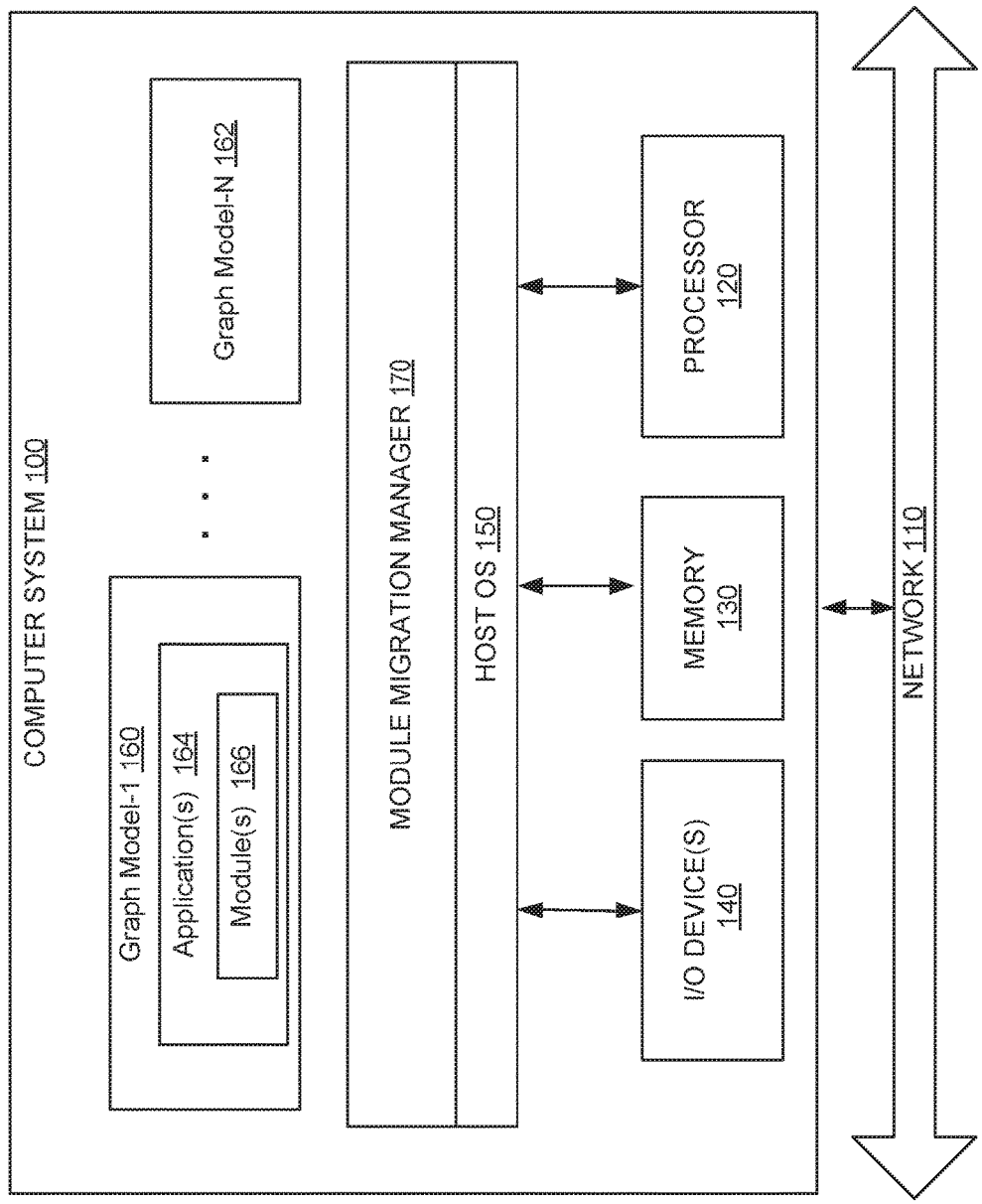
FIG. 1 is a block diagram of a computer system to support graph modeling of applications for detection of duplicate modules according to an implementation of the disclosure.

Embodiments of the disclosure provide for graph modeling of applications for detection of duplicate modules. Although aspects the disclosure may be described with respect to the migration of applications comprising the duplicate modules, the systems and methods described herein may be useful for various types of application analysis. The term "application" is used to refer to any combination of software and hardware components that perform a desired function. A "module" is used to refer to logical container (e.g., a library) for executable code related to a particular task. In some cases, an application may be a single or group of software programs that operate with a hardware platform. Some applications may use multiple software libraries or modules, each of which may be written in a number of different programming languages and may execute a plurality of different application processes on the hardware platform.

Each application may include source code of libraries that are developed by different users operating in conjunction with each other on a particular development project. The library source code may include certain modules of the application that are intended to be reused with the development projects. These development projects may be associated with metadata that indicates how the applications and/or libraries depend on each other. This dependency represents an order and the technologies used to build a binary distribution (e.g., an executable file) of the applications that may be run on a server. In some situations, the binary distribution may be a type of archived file which is self-contained piece of information available on the server. For example, the archived file may include an electronically compressed file (e.g., zip file) that contains other compressed files. In this regard, the libraries of an application may be installed on a server for execution by extracting the libraries from the compressed (zip) files.

Many libraries of the applications may be migrated, for example, from a first environment to a second environment for various reasons. For example, when software developers complete a new computer application, they may move the application from a development environment to a texting or work environment where the application can be used by others. In another example, existing applications may be migrated from a first environment on a server running a legacy architectural platform or operating system to a second environment on new server that may be running a new platform or operating system.

In some cases, certain tools may be used to analyze the application program interfaces (APIs), libraries, architectures and other aspects of the applications the software developers plan to migrate. For example, some migration tools may extract files from the archives storing source code of the application, compile files, scan and classify file types, and analyze other types of file content to build reports regarding the applications. These tools may also build data models based on the extracted files that store library data and relationships between these libraries of the application. These data models can then be queried by the migration tools for reporting purposes.

There are, however, several issues that can occur when analyzing applications using these types of migration tools. For example, some systems may consist of many applications comprising a larger number of libraries (modules) that are often shared and/or duplicated. A "shared" library is a library that is present in more than one application. A "duplicate" library is a library that is present in more than one single application. In this regard, the applications may include a plurality of shared or duplicated libraries that are dependent on each other to perform certain tasks. Due to the interconnected complexity of the application libraries, many migration tools are not able to accurately quantify aspects (e.g., migration time/effort and memory/storage space utilization) of the applications. Because of this, systems to migrate the application from one platform to another may use an excessive amount or not enough of time and resources to successfully complete the migrations. In turn, this can adversely impact the development and deployment of the applications for users.

Implementations of the disclosure address the above-mentioned and other deficiencies by providing techniques to detect and take into account duplicate modules when quantifying aspects of system application, for example, for application migration. This may allow certain user to determine an efficient amount of resources to utilize for migrating applications that contain these duplicated modules. The techniques may implement a module migration manager that uses dependency graph models (e.g., a data structure) of applications to detect the duplicated modules of the applications. The module migration manager to use this information regarding the duplicated modules to determine what amount of resources to utilize in the application migration process.

The graph is a type of data structure comprising nodes (also referred to as vertices), edges and attributes (also referred to as properties) to organize and store data in a database. A "node" may represent, for example, an executable code module of an application. An "edge" may represent a relationship between a pair of nodes. "Attributes" are stored information that relates to the nodes or edges. The nodes in the graph may be connected together by one or more edges representing a dependency relationship between the pair of nodes. In some implementations, the graph may be produced by analyzing compressed (zip) files of the source code of one or more applications. For example, certain tools may be used to extract modules from these compressed files and make nodes in the graph based on the extracted modules. The edges of the graph may represent relationships between the extracted modules, such as how a particular file for a module contains other zip files.

For each module of the graph, the module migration manager determines if there is a duplicate of that module on the graph. For example, the module migration manager may select a node associated with a module and determine whether a hash value of that module matches the hash values associated with other modules in the graph. Each hash value for the modules is a unique value generated using a hash function. For example, the hashing algorithm takes the contents of the module as input and returns a hash value based on that input. In some implementations, a SHA1 (Secure Hash Algorithm) hashing function may be used as well as other hashing functions, such as MD5 (Message Digest), SHA256, etc. The module migration manager marks all nodes that are detected as have matching hash values with information that this corresponding node is duplicated.

Upon detecting the matching nodes, the module migration manager searches for a canonical representation (also referred to a canonical archive) of the nodes. The canonical representation is the first instance of a particular resource that is discovered. For example, if an application has the following modules, discovered in this order:

1. App.war
2. App.war/resource1.jar
3. App.war/resource2.jar
4. App.war/resource1-copy1.jar
5. App.war/resource1-copy2.jar In this case, the app.war/resource1.war resource is discovered first and it becomes the canonical archive. Later, when both app.war/resource1-copy1.jar and app.war/resource1-copy2.jar are discovered, they would be marked as duplicate archives. The vertices that are created for these would have edges pointing back to the canonical vertex (app.war/resource1.war).

If no canonical representation is found, the module migration manager adds a new node to the graph and creates the canonical archive at that time. The new node references an archive file that stores contents of the module that is duplicated. Then, if another module with the same hash is discovered, the module migration manager creates a duplicate archive vertex instead of a canonical vertex, and connects this discovered duplicate back to the canonical representation. For example, the module migration manager links each of the detected matching nodes in the graph to the new node. For example, the module migration manager adds a reference pointer to each of the matching nodes in the graph. In some implementations, the reference pointer may point to the memory address of the new node with respect to a memory device storing the graph.

In some implementations, the module migration manager can implement several configurable traversal strategies to traverse the nodes of the graph to perform different kinds of analysis for the applications, such as to determine and report on what amount of resources (e.g., memory/storage space) and time to allocate for the application migration. In some implementations, the traversal strategies may be implemented as processing logic (e.g., in software and/or hardware) that takes as input a traversal algorithm, a portion or all of the updated graph and a selection criterion, and returns as output the amount of resources to allocate for the application migration. Some examples of traversal algorithms used by the module migration manager may include, but not limited to, an algorithm to find the shortest path between nodes and the like. Using the traversal algorithm to traverse the graph, the module migration manager may then select certain nodes to count based on the selection criterion. For example, the selection criterion provides a set of rules to indicate which nodes to visit (e.g., examine contents of the node) while traversing the graph using a particular traversal algorithm.

In one implementation, the selection criterion may indicate that the module migration manager is to only take into account the modules of the canonical archive nodes when determining the amount of resources (e.g., time indicating an amount of migration effort and/or memory/storage space) to allocate for a particular application migration. For example, for every duplicate node encountered during traversal of the graph, the module migration manager is directed to the canonical node to check whether it is already counted or not in the resource determination. In another implementation, a selection criterion can be implemented for the module migration manager to take into account the modules associated with the duplicated archive nodes, rather than the canonical node. For example, some users may want the total size of just the duplicate libraries used in the applications because even the ones that are duplicated are physically on the disk. Still further, other selection criterion can be implemented to traverse the nodes of the graph to determine and report on what is the amount of resources should be allocated for a particular application's migration. Thus, an advantage of the module migration manager is that it may help certain users to determine and efficiently allocate out an amount of time and memory/storage space (based on the size of the modules) for a project migration.

FIG. 1 is a block diagram 100 of a computer system 110 in which implementations of the disclosure may operate. "Computer system" herein shall refer to a system comprising one or more computing devices, one or more memory devices, and one or more communication interfaces. As shown, the computer system 100 may be coupled to a network 110 and include one or more processing devices (e.g., processor 120) communicatively coupled to memory (e.g., memory 130) and one or more input/output (I/O) devices (e.g., I/O devices 140). The network 110 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

"Processor" 120 herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, processor 120 may be implemented as a single integrated circuit, two or more integrated circuits, or may be a component of a multi-chip module (e.g., in which individual microprocessor dies are included in a single integrated circuit package and hence share a single socket). A processor 120 may also be referred to as a central processing unit (CPU).

"Memory" 130 herein refers to a volatile or non-volatile memory device, such as RAM, ROM, EEPROM, or any other device capable of storing data. "I/O device" 140 herein refers to a device capable of providing an interface between a processor and an external device capable of inputting and/or outputting binary data. Although, for simplicity, a single processor 120 is depicted in FIG. 1, in some other embodiments the computing devices of computer system 100 may comprise a plurality of processors. Similarly, in some other embodiments the computing devices of computer system 100 may comprise a plurality of I/O devices, rather than a single I/O device 140.

The computer system 100 may be a server, a mainframe, a workstation, a personal computer (PC), a mobile phone, a palm-sized computing device, etc. The computer system 100 may run "host" software, such host operating system 150 to manage the hardware and other types of system resources that may include processors 120, memory 130, I/O device 140 to provide functions such as inter-process communication, scheduling, memory and data management, and so forth. For example, the host operating system 150 of server 110 may include a virtualization manager (not shown), such as a hypervisor. Alternatively, the hypervisor may a "bare metal" hypervisor that runs on hardware of computer system 100 without an intervening operating system. The hypervisor 150 may abstract the physical layer of the computer system 100, including processor 120, memory 130, and I/O device 140, and present this abstraction to a client application container, such as a virtual machine.

System 100, in implementations, may include one or more graph models-1 through N 160, 162. In some implementations, the graph models 160 may be stored on a separate component (e.g., a storage device) from server 110. In alternative implementations, the graph models 160 may be included with the computer system 100. For example, all or part of the graph models 160 may be stored in the memory 130 of computer system 100. In other implementations, the graph models 160 can be divided into multiple databases with components that can be geographically dispersed and accessible, for example, via network 110.

Each of the graph models-1 through N 160 use a graph data structure comprising nodes (also referred to as vertices), edges and attributes (also referred to as properties) to organize and store data. A "node" may represent, for example, an entity such as a module 166 of one or more applications 164. An "edge" may represent a relationship between a pair of nodes. "Attributes" are stored information that relates to the nodes or edges. The nodes in the graph models-1 through N 160 may be connected together by one or more edges representing a dependency relationship between the pair of nodes. In some implementations, the graph models-1 through N 160 may be based on compressed (zip) files of the source code of the one or more applications 160. For example, certain tools may be used to extract modules from these compressed files and make nodes in the graph models-1 through N 160 based on the extracted modules. The edges of the graph models-1 through N 160 may represent a relationship between the extract modules, such as how a particular file for a module contains other zip files.

In some situations, the applications 164 of system 100 may be migrated, for example, from a first environment (e.g., a system for executing applications) to a second environment for various reasons. For example, when software developers complete a new computer application, they may move the application from a development environment to a texting or work environment where the application can be used by others. In another example, existing applications may be migrated from a first environment on a server running a legacy architectural platform or operating system to a second environment on new server that may be running a new platform or operating system.

To facilitate operations of the disclosure to support application migration, the computer system 100 may include a module migration manager 170. The migration manager 170 uses the graph models-1 through N 160 to detect and take into account the duplicated modules of the applications to determine what amount of resources (e.g., time and/or memory/storage space) should be used for the migration. In some implementations, the module migration manager 170 may include processing logic (e.g., stored in software and/or hardware) executed by the host OS 150 to provide the benefits of the disclosure. The module migration manager 170 can exist in a fewer or greater number of modules than what is shown, with such modules residing at one or more processing devices of computer system 100, which may be geographically dispersed.

Figure 2:
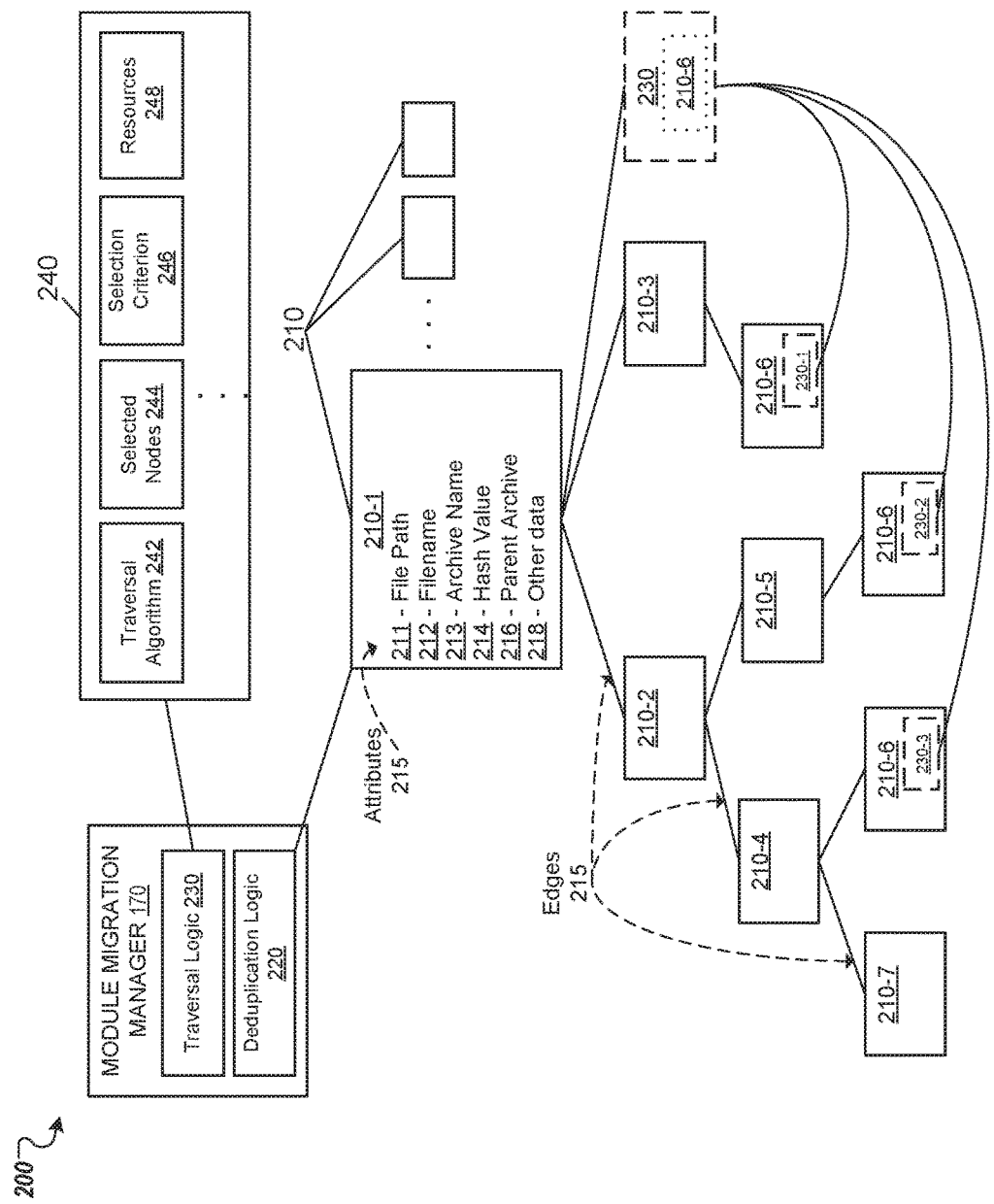
FIG. 2 is a block diagram of a system including a data structure to support graph modeling of applications for detection of duplicate modules according to an implementation of the disclosure.

FIG. 2 is a block diagram of a system 200 including a data structure 210 also referred to as a graph data structure according to an implementation of the disclosure. The system 200 may be employed to support graph modeling of applications for detection of duplicate modules according to an implementation of the disclosure. The graph data structures 210 may be the same as the graph models 160, 162 of FIG. 1, and may represent one or more applications. In some implementations, the graph data structure 210 may comprises a plurality of nodes 210-1 through 7 (also referred to as vertices), edges 215 and attributes 217 (also referred to as properties) to organize and store data in a memory device, such as a database.

A "node" 210-1 through 7 represents, for example, an executable code module of an application or another application comprising additional modules. An "edge" 215 represents a relationship between a pair of nodes. "Attributes" 217 are stored information that relates to the nodes or edges. For example as shown in FIG. 2, node 210-1 may include the following attributes, but not limited to, a file path 110 to a file storing contents of the module associated with the node, a filename 212 of the file, an archive name 213 of an archive of the file, a hash value 214 representing the contents of the file, a parent archive name 216 of a parent archive to the archive of the file as well as other data 218.

Nodes 210-1 through 7 in the graph data structure 210 may be connected together by one or more edges 217 representing a dependency relationship between the pair of nodes 210-1 through 7. In some implementations, the graph data structure 210 may be based on compressed (zip) files of the source code of one or more applications. For example, certain tools may be used to extract modules from these compressed files and make nodes 210-1 through 7 in the graph data structure 210 based on the extracted modules. The edges 217 of the graph data structure 210 represent relationships between the extract modules, such as how a particular file for a module contains other zip files.

As shown, system 200 includes the module migration manager 170 of FIG. 1. In this example, the module migration manager 170 includes processing logic, such as deduplication logic 220 and traversal logic 230 (e.g., stored in software and/or hardware) that can be executed (e.g., by host OS 150) to provide the benefits of the disclosure. For example, the deduplication logic 220 may direct the module migration manager 170 to detect duplicates amongst the modules 210-1 through 7 of the graph data structure 210, and the traversal logic 230 may be used to determine an efficient amount of resources (e.g., resource time and/or memory/storage space) to use in migrating applications that include these duplicated modules.

To determine if there are duplicate modules on the graph data structure 210, the module migration manager 170 may examine the attributes 217 of each module of the graph data structure 210. For example, the module migration manager may select a node 210-6 of the graph data structure 210 and compare that node to other nodes of the graph. This selected node may be the first node leading to a branch of other dependent nodes associated with the graph data structure 210 or other nodes of the graph. In some implementations, the module migration manager 170 systemically traverses the graph so that each node in the graph data structure 210 is compared to the other nodes of the graph to detect any duplicate modules associated with the nodes. For example, if there are no detected duplicate modules in the graph for the selected node, the module migration manager 170 may select another node to determine whether that node has duplicates. This selection process may continue until all or a determined portion of the graph is checked for duplicates.

To determine whether the module of selected node is a duplicate of another node in the graph data structure 210, the module migration manager 170 may determine a match between the hash values 214 associated with each node. For example, the hash value 214 is a unique value generated based on a hashing algorithm (e.g., a SHA1, MD5, SHA256 hashing algorithm). In some implementations, the hashing algorithm takes the contents of the module associated with a corresponding node as input and returns a unique hashing value based on that input. This hash value of the each module is stored with the corresponding node associated with the graph. Then, the module migration manager 170 marks all nodes that are detected as have matching hash values with information that this archive is duplicated. For example, the module migration manager 170 may include a flag or other types of information in the attributes field (e.g., in the other data field 218) of the node that indicates the modules associated with node is a duplicate.

Upon detecting matching nodes in the graph data structure 210, the module migration manager 170 searches for a canonical representation (also referred to a canonical archive) of the nodes. The canonical representation is the first instance of a particular resource that is discovered. If no canonical representation is found, the module migration manager 170 inserts a new node to the graph. For example, if the migration manager 170 determines that node 210-6 are associated with duplicate modules, the manager 170 may insert a reference node 230 in the graph 210. The reference node 230 may include a reference (e.g., archive name) to an archive file that stores contents of the module that is duplicated.

Then, for each of the other detected matching nodes with the same hash, the module migration manager 170 creates a duplicate archive vertex instead of a canonical vertex, and connects this discovered duplicate back to the canonical representation. For example, the module migration manager 170 links each of the detected matching nodes 210-6 in the graph 210 to the reference node 230. For example, the module migration manager 230 adds a reference pointer 230-1, 230-2, 230-3, to each of the matching nodes 210-6 in the graph 210. In some implementations, the reference pointers 230-1, 230-2, 230-3 may point to a memory address of the reference node 230. For example, the module migration manager 230 determines a memory location of the reference node with respect to the graph data structure 210. This memory location may be a memory address of the reference node 230 in database or other types of memory devices storing the graph 201. In some implementations, the module migration manager 230 may retrieve and store the memory location when it inserts the reference node 230 in the graph 210. The module migration manager 230 then associates the memory address of the reference node 230 with the reference pointers 230-1, 230-2, 230-3 so that each includes information of the storage location of the reference node 230.

Once the nodes of the duplicate modules are marked in the graph data structure 210, the module migration manager 170 utilizes the traversal logic 230 to produce data 240 on the amount of time and resources that should be allocated for migrating applications represented by the graph 210. In some implementations, the data 240 may be used in a report that can be presented to the user, e.g., via a graphical user interface (GUI) of system 200. The traversal logic 230 of module migration manager 170 can implement several configurable traversal strategies to traverse the nodes of the graph 210. This traversal of the graph 210 may be used to perform different kinds of analysis for the applications, such as to determine and report on what amount of resources (e.g., memory/storage space) and time to allocate for the application migration.

In some embodiments, the traversal logic 230 takes as input a traversal algorithm 242, selected nodes 244 of the updated graph 210 and a selection criterion 246, and returns as output the amount of resources 248. For example, the resources 248 may indicate the amount of resources that should be allocated for the application migration. Some examples of traversal algorithms 242 used by the traversal logic 230 may include, but not limited to, an algorithm to find the shortest path between nodes and the like. Using the traversal algorithm 242 to traverse the graph, the traversal logic 230 may then select certain nodes to count based on the selection criterion. In some implementations, the selection criterion provides a set of rules to indicate which nodes to visit (e.g., examine contents of the node) while traversing the graph using a particular traversal algorithm 242. The selection criterion 246 provides a set of rules to indicate which nodes of a graph 210 for the module migration manager 170 to visit while traversing the graph 210 for a particular traversal strategy 242.

In one implementation, the selection criterion 246 of the traversal strategies 242 may indicate that the module migration manager 170 is only to count the modules of canonical nodes (such as reference node 230) when determining the amount of resources (e.g., time and memory/storage space) to allocate for a particular migration. For example, for every duplicate node encountered during traversal of graph 210, the module migration manager 170 may be directed (e.g., via the reference pointers 230-1, 230-2, 230-3) to the reference node 230 to check whether it is already counted in the migration resource 248 determination. In another implementation, a selection criterion 246 can be implemented for the module migration manager 170 to take into a total account of the storage size of modules associated with just the duplicated nodes (e.g., nodes 201-6), rather than the reference node 230. For example, some users may want the total size of all modules used in the applications because even the ones that are duplicated are physically taking disk space. Still further, other types traversal strategies 242 can be implemented to traverse the nodes of the graph 210 to determine and report on what is the amount of effort (e.g., time and resources) to allocate for migrating particular applications.

Figure 3:
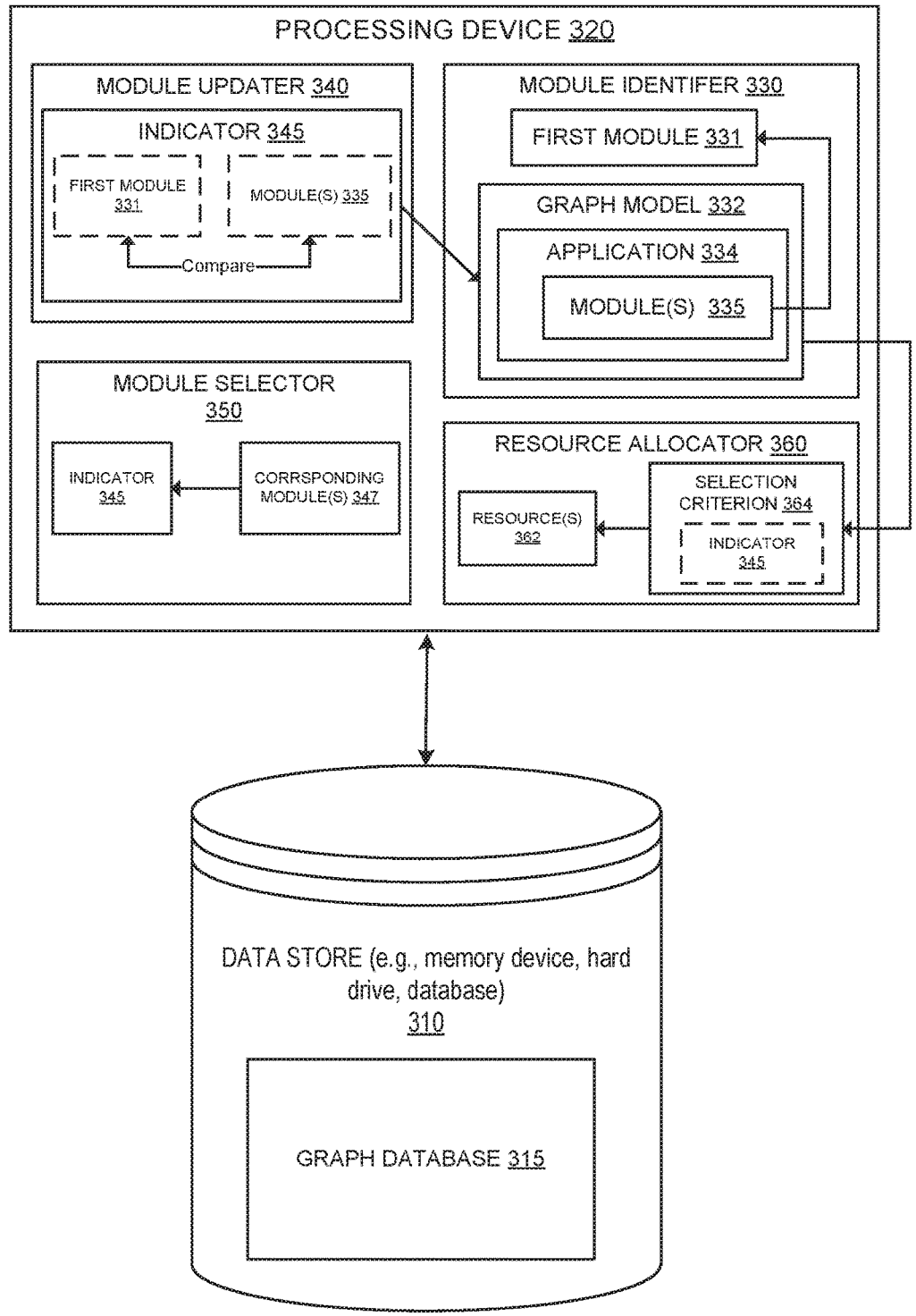
FIG. 3 is a block diagram of an apparatus including a memory to support graph modeling of applications for detection of duplicate modules according to an implementation of the disclosure.

FIG. 3 is a block diagram of an apparatus 300 including memory, such as data store 310, to support graph modeling of applications for detection of duplicate modules according to an implementation of the disclosure. The apparatus 300 may be the same or similar to components within the computer system 100 of FIG. 1. In some implementations, the apparatus 300 may include processing device 320 (which may be the same or similar to processor 120), operatively coupled to memory 310 (which may be the same or similar to memory 130), to execute instructions for carrying out the operations as discussed herein. As shown, the apparatus 300 may execute instructions for a module identifier 330, a module update 340, a module selector 350, and a resource allocator 360 to allocate resource to, for example an application 334 for a target platform migration.

Data store 310 may include any non-persistent data storage (e.g., memory), persistent and/or volatile data storage (e.g., flash storage, hard drive, tape), other medium, or combination thereof that is capable of storing instructions for carrying out the operations of the apparatus 300 discussed herein. In some implementations, the data store 310 may store data for a plurality of graphs, such as graph models-1 through N 160, 162 of FIG. 1. For example, the data store 310 stores the graphs in a graph database 315. The graph database 315 that is used for storing and retrieving vast amount of information by using graphs as a database abstraction to link related information.

A "graph" (such as graph model 332) is a type of data structure comprising nodes (also referred to as vertices) and edges to organize and store data. A "node" may represent, for example, an entity such as a module of an application or another application. An "edge" may represent a relationship between a pair of nodes. The nodes in the dependency graph may be connected together by one or more edges representing a dependency relationship between the pair of nodes. In some implementations, the apparatus 300 may receive compressed (zip) files of the source code of one or more applications. The module migration manager may extract modules from these compressed files and make nodes in the dependency graph based on the extracted modules. In that regard, the edges of the graph may represent a relationship between the extract modules, such as how a particular file for a module contains other zip files.

In operation of the apparatus 300, module selector 330 selects a first module 331 of a plurality of modules 335 (e.g., executable code modules) of an application 334 represented by a graph data structure 332. For example, the module selector 330 may select a node of the graph data structure 332 that corresponds to the first module 331. This selected node may be the first node in a branch of nodes associated with the graph data structure 332 or other nodes of the graph 332. In some implementations, the module selector 330 systemically traverses the graph data structure 332 so that each node in the graph 332 is compared to the other nodes of the graph to detect any duplicate modules associated with the nodes. For example, if there are no detected duplicate modules in the graph for the first module 331, the module selector 330 may select another node to determine whether that node has duplicates. This selection process may continue until all or a determined portion of the graph 332 is checked for duplicates.

Module updater 340 updates the graph data structure 332 with an indicator 345 for each of the plurality of modules 335 matching the first module 331. For example, the module updater 340 may determine a match between the hash values of each node associated with the first module 331 and the other modules 335. For example, the hash value is a unique value generated based on a hashing algorithm. In some implementations, the hashing algorithm takes the contents of a particular module associated with a corresponding node as input and returns a unique hashing value based on that input. The module updater 340 then marks all nodes that are detected as have matching hash values with the indicator 345 to indicate that this archive is duplicated. For example, the indicator 345 may include a flag or other types of information stored in the attributes field of the nodes associated with the corresponding modules 347.

The module updater 340 then links the other modules 335 associated with the indicator 345 to a reference node 355 of the graph data structure 332. For example, the module linker 350 inserts a reference node 355 into the graph data structure 332 that references an archive file storing contents of the first module 331 that is duplicated. Then, the module linker 350 links this reference node 355 to each of the nodes of the graph 332 associated with the corresponding modules 347. For example, the module linker 350 adds a reference pointer to each of the nodes of the graph 332 associated with the corresponding modules 347. In some implementations, the reference pointer may points to a memory address of the reference node 355. For example, the module linker 350 determines a memory location of the reference node 355 with respect to the graph data structure 350. This memory location may be a memory address of the reference node 355 in database or other types of memory devices storing the graph 332.

Module selector 350 select one or more corresponding executable code modules 347 associated with the graph data structure 332 in view of the indicator 335. For example, a user may be provided with an interface to select a portion or all of the application to evaluate for migration. The module selector 350 may then use traversal algorithm to traverse the modules 347 marked by the indicator 335. Some examples of traversal algorithms used by the module selector 350 may include, but not limited to, an algorithm to find the shortest path between nodes and the like.

Using the graph data structure 332, resource allocator 360 determines an amount of resource 362 to allocate for a migration of the application 334 in view of a selection criterion 364. The selection criterion 364 indicates which of the corresponding modules 335 associated with the indicator 346 to count in the migration. For example, the selection criterion 364 may indicate that the resource allocator 360 is only to count the reference node 355 when determining the amount of resources (e.g., time and memory/storage space) to allocate for a particular migration. In another implementation, a selection criterion 364 may indicate that the resource allocator 360 is only to take into account the total size of the storage size of the corresponding modules 335 associated with just the duplicated nodes, rather than the reference node 230.

Figure 4:
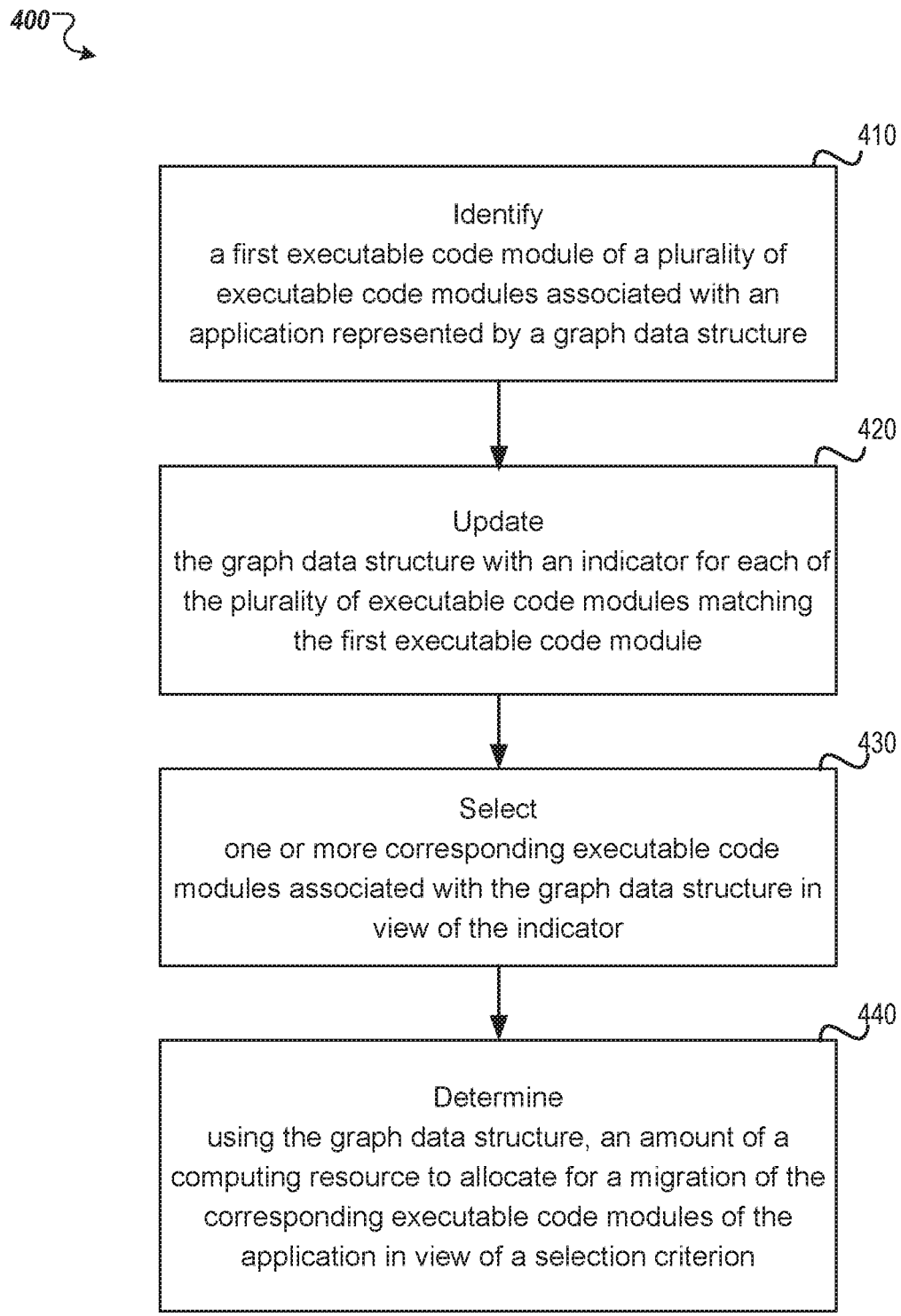
FIG. 4 illustrates a flow diagram of a method of graph modeling of applications for detection of duplicate modules according to an implementation of the disclosure.

FIG. 4 depicts a flow diagram of one implementation of a method 400 in accordance with one or more aspects of the disclosure. In one implementation, the processing device 320 of FIG. 3 may perform method 400 to support graph modeling of applications for deduplication of shared. The method 400 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 400 and each of its individual functions. In certain implementations, a single processing thread may perform method 400. Alternatively, two or more processing threads with each thread executing one or more individual functions, routines, subroutines, or operations may perform method 400. It should be noted that blocks of method 400 depicted in FIG. 4 can be performed simultaneously or in a different order than that depicted.

Referring to FIG. 4, at block 410, method 400 identifies a first executable code module 331 of a plurality of modules 335 associated with an application 334 represented by a graph data structure 332. In block 420, the graph data structure 332 is updated with an indicator 345 for each of the plurality of modules 335 matching the first module 331. The indicator 345 references a location of the first executable code module 331 with respect to the graph data structure 332. In block 430, one or more corresponding executable code modules 347 associated with the graph data structure 332 are selected in view of the indicator 345. Using the graph data structure 332, an amount of resources 362 to allocate for a migration of the corresponding executable code modules 347 of the application 334 is determined in block 440 in view of a selection criterion 364. The selection criterion 364 indicates which of the corresponding modules 347 to account for in the migration.

Figure 5:
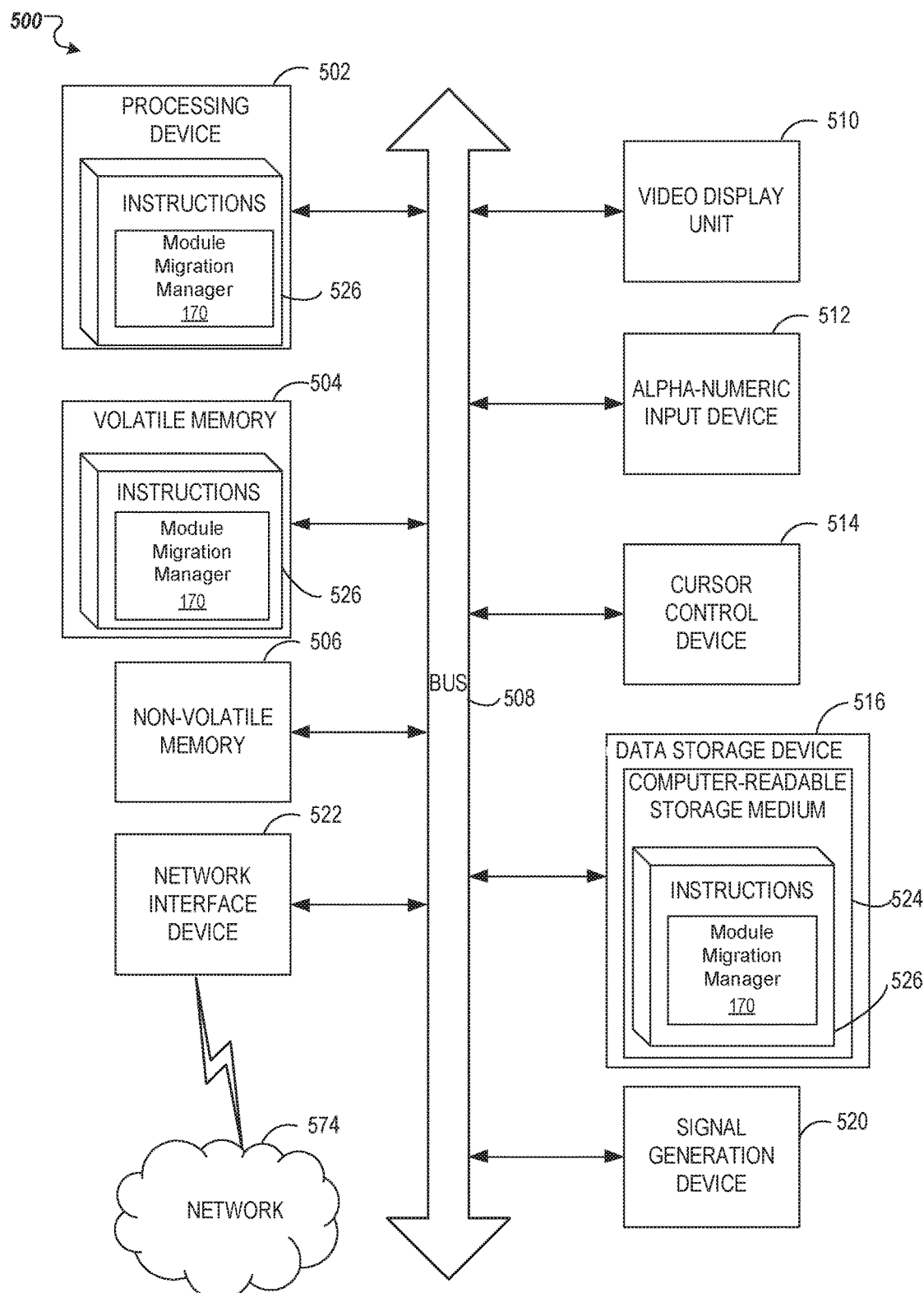
FIG. 5 illustrates a block diagram illustrating a machine in which implementations of the disclosure may be used.

FIG. 5 depicts a block diagram of a machine in the form of a computer system 500 within which a set of instructions, for causing the machine to perform any one or more of the methodologies discussed herein, may be executed. In various illustrative examples, computer system 500 may correspond to a processing device 120, 220 within system 100 or system 300 of FIG. 1 and FIG. 2 respectively. The machine 500 may be included within a data center that supports virtualization. Virtualization within a data center results in a physical system being virtualized using virtual machines to consolidate the data center infrastructure and increase operational efficiencies.

A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for live storage domain decommissioning.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding the module migration manager 170 of FIG. 1 for implementing method 400 of FIG. 4 to support graph modeling of applications for detection of duplicate modules.

Instructions 526 may also reside, completely or partially, within volatile memory 504 and/or within processing device 502 during execution thereof by computer system 500, hence, volatile memory 504 and processing device 502 may also constitute machine-readable storage media.

While non-transitory computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "identifying," "determining," "intercepting," "updating," "retrieving," "generating," "inspecting," "causing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appears as set forth in the description below. In addition, the disclosure is not described with reference to any particular programming language. It is appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An apparatus comprising:
    a memory to store a plurality of graph data structures; and
    a processing device, operatively coupled to the memory, to:
        identify a first executable code module of a plurality of executable code modules associated with an application represented by a graph data structure;
        update the graph data structure with an indicator for each of the plurality of executable code modules matching the first executable code module, wherein the indicator references the first executable code module;
        select one or more corresponding executable code modules associated with the graph data structure in view of the indicator; and
        determine, using the graph data structure, an amount of a computing resource to allocate for a migration of the corresponding executable code modules of the application in view of a selection criterion.

2. The apparatus of claim 1, wherein the processing device is further to generate a hash value using contents of at least one of the corresponding executable code modules associated with the indicator.

3. The apparatus of claim 1, wherein processing device is further to determine a match between a first hash value representing contents of the first executable code module and a second hash value representing contents of at least one of the corresponding executable code modules.

4. The apparatus of claim 1, wherein the processing device is further to:
    determine a memory location of a reference node associated with the first executable code module; and
    add an address pointer pointing to the memory location to each node of the graph data structure associated with the corresponding executable code modules.

5. The apparatus of claim 1, wherein the processing device is further to:
    determine a shortest path between the nodes of the graph data structure; and
    traverse, using the shortest path, nodes of the graph data structure, each of the nodes represents at least one of the corresponding executable code modules.

6. The apparatus of claim 4, wherein the processing device is further to determine, in accordance with the selection criterion, whether resources associated with each of the traversed nodes are previously selected in the migration.

7. The apparatus of claim 1, wherein the processing device is further to determine, in accordance with the selection criterion, an amount of resources associated with a total of the corresponding executable code modules.

8. A method comprising:
    identifying, by the processing device, a first executable code module of a plurality of executable code modules associated with an application represented by a graph data structure;
    updating, by the processing device, the graph data structure with an indicator for each of the plurality of executable code modules matching the first executable code module, wherein the indicator references the first executable code module;

selecting, by the processing device, one or more corresponding executable code modules associated with the graph data structure in view of the indicator; and determining, by the processing device using the graph data structure, an amount of a computing resource to allocate for a migration of the corresponding executable code modules of the application in view of a selection criterion.

9. The method of claim 8, further comprising generating a hash value using contents of at least one of the corresponding executable code modules associated with the indicator.

10. The method of claim 8, further comprising determining a match between a first hash value representing contents of the first executable code module and a second hash value representing contents of at least one of the corresponding executable code modules.

11. The method of claim 8, further comprising:
determine a memory location of a reference node associated with the first executable code module; and
adding an address pointer pointing to the memory location to each node of the graph data structure associated with the corresponding executable code modules.

12. The method of claim 8, further comprising:
determining a shortest path between the nodes of the graph data structure; and
traversing, using the shortest path, nodes of the graph data structure, each of the nodes represents at least one of the corresponding executable code modules.

13. The method of claim 12, further comprising determining, in accordance with the selection criterion, whether resources associated with each of the traversed nodes are previously selected in the migration.

14. The method of claim 8, further comprising determining, in accordance with the selection criterion, an amount of resources associated with a total of the corresponding executable code modules.

15. A non-transitory computer-readable medium comprising instructions that, when executed by a processing device, cause the processing device to:

identify, by the processing device, a first executable code module of a plurality of executable code modules associated with an application represented by a graph data structure;

update the graph data structure with an indicator for each of the plurality of executable code modules matching the first executable code module, wherein the indicator references the first executable code module;

select one or more corresponding executable code modules associated with the graph data structure in view of the indicator; and determine, using the graph data structure, an amount of a computing resource to allocate for a migration of the corresponding executable code modules of the application in view of a selection criterion.

16. The non-transitory computer-readable medium of claim 15, wherein the processing device is further to generate a hash value using contents of at least one of the corresponding executable code modules associated with the indicator.

17. The non-transitory computer-readable medium of claim 15, wherein processing device is further to determine a match between a first hash value representing contents of the first executable code module and a second hash value representing contents of at least one of the corresponding executable code modules.

18. The non-transitory computer-readable medium of claim 15, wherein the processing device is further to:
determine a memory location of a reference node associated with the first executable code module; and
add an address pointer pointing to the memory location to each node of the graph data structure associated with the corresponding executable code modules.

19. The non-transitory computer-readable medium of claim 15, wherein the processing device is further to:
determine a shortest path between the nodes of the graph data structure; and
traverse, using the shortest path, nodes of the graph data structure, each of the nodes represents at least one of the corresponding executable code modules.

20. The non-transitory computer-readable medium of claim 19, wherein the processing device is further to determine, in accordance with the selection criterion, whether resources associated with each of the traversed nodes are previously selected in the migration.

* * * * *